No. 734,683. PATENTED JULY 28, 1903.
J. F. DUKE.
PROCESS OF OBTAINING GOLD FROM SEA WATER.
APPLICATION FILED DEC. 27, 1899.
NO MODEL.
2 SHEETS—SHEET 1.
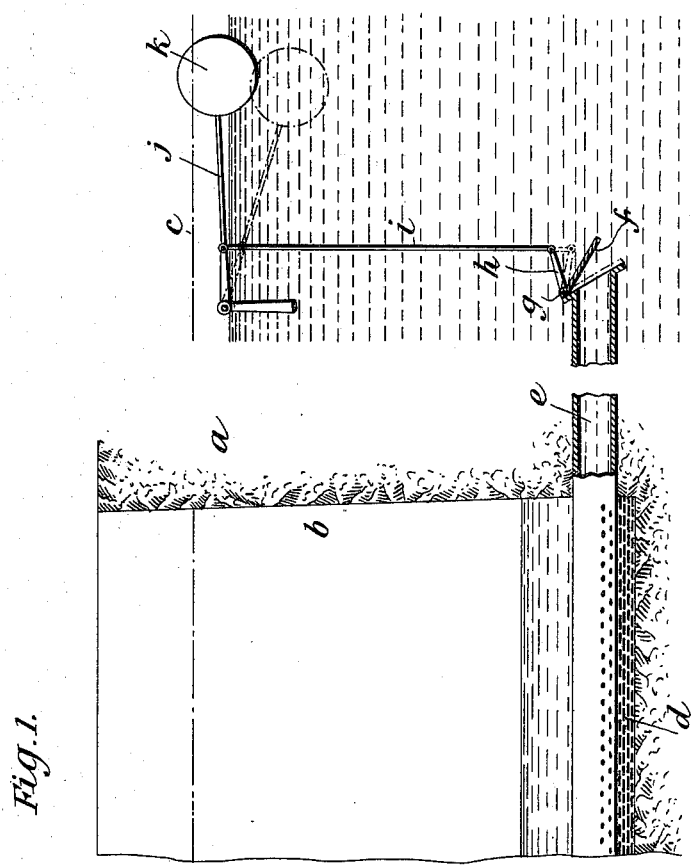
Fig.1.
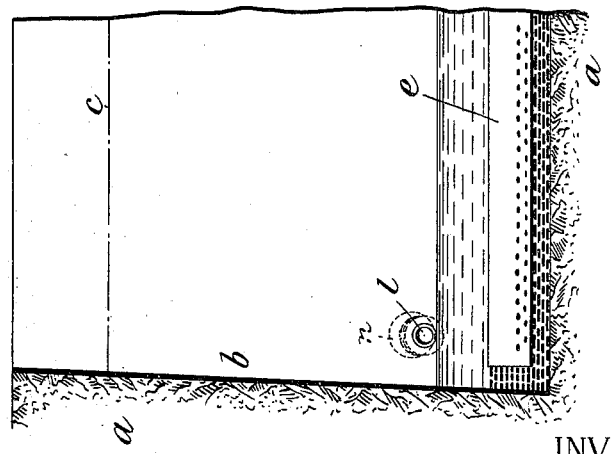
WITNESSES:
René Bruijne
Thomas F. Wallace
INVENTOR:
John Frederick Duke
By his Attorneys,
Arthur C. Fraser & Co.

No. 734,683. PATENTED JULY 28, 1903.
J. F. DUKE.
PROCESS OF OBTAINING GOLD FROM SEA WATER.
APPLICATION FILED DEC. 27, 1899.
NO MODEL. 2 SHEETS—SHEET 2.
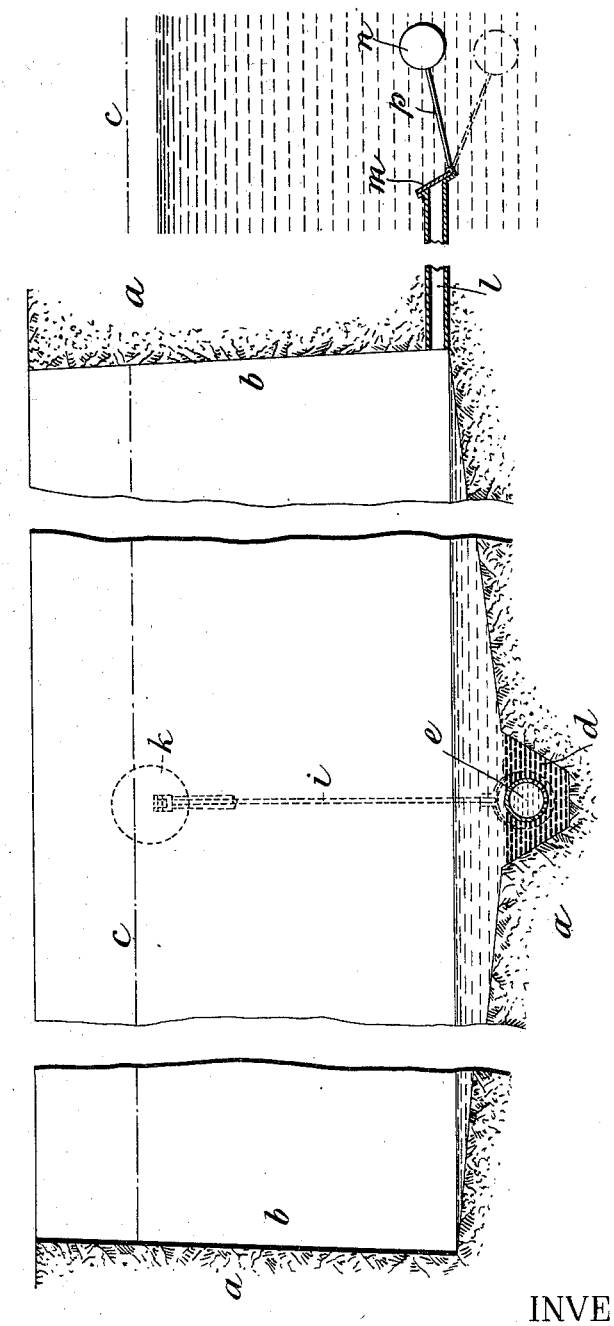
WITNESSES:
INVENTOR:

No. 734,683.

Patented July 28, 1903.

UNITED STATES PATENT OFFICE.

JOHN F. DUKE, OF LONDON, ENGLAND.

PROCESS OF OBTAINING GOLD FROM SEA-WATER.

SPECIFICATION forming part of Letters Patent No. 734,683, dated July 28, 1903.

Application filed December 27, 1899. Serial No. 741,709. (No specimens.)

*To all whom it may concern:*

Be it known that I, JOHN F. DUKE, chemist, of 160 Rosendale road, West Dulwich, in the county of London, England, have invented certain new and useful Improvements in Obtaining Gold from Sea-Water or other Solutions Containing the Same and Means for the Purpose, of which the following is a specification.

It is a well-known fact that sea-water contains a certain amount of gold, generally from, say, one to five grains per ton. Repeated attempts have been made to precipitate this gold electrically and also by the decomposition of metallic bodies, such as zinc, and amalgamating the precipitate with mercury, from which the gold has been ultimately recovered by distillation. The expense of these processes has, however, been so great that although gold was obtained it was not in sufficient quantity to repay the cost of extraction. Further, it is well known that gallic and tannic acids and albuminous bodies, and, in fact, most organic substances, will decompose salts of gold, and thereby reduce the gold to the metallic state. This method, however, in view of the extremely small quantity of gold in sea-water and the fact that whatever solution is added to the sea-water is run off afterward with the water, is too costly.

Now I have discovered that gold, even in extremely dilute solutions, is precipitated by those calcic earths which by forming a haloid with the halogen of the gold salts will thereby reduce the gold to the metallic state. One eminently suitable earth is the carbonate of calcium in the form of chalk.

My invention therefore consists in obtaining gold from sea-water containing it by reducing it to the metallic state by means of carbonate of calcium in the manner explained.

For the purpose of carrying out my invention as applied to sea-water in an economical manner I may make use of chalk cliffs at or near the sea-shore, and I preferably proceed as follows: In calcic strata, such as chalk cliffs at or near the sea-shore, I dig out a reservoir having its top edge about six feet above the highest water-mark and its outlet slightly above low-water mark. The sides of the reservoir preferably slope so that the top area is somewhat smaller than the bottom area. There is a sump at the middle extending from end to end. Supported in this sump free from the bottom is an inlet-pipe perforated, preferably, along its under side. This pipe is fitted with an automatic or other valve, preferably so arranged as not to open until the tide has risen about eighteen feet, (assuming the normal rise to be twenty feet.) There are one or more outlet-pipes at a somewhat higher level than the sump, and these outlet-pipes are also fitted with valves, preferably automatic.

Figure 1 of the accompanying drawings is a longitudinal section, and Fig. 2 a transverse section, illustrating the means or apparatus by which my invention may be carried into effect in the manner above described.

*a* represents a chalk cliff at or near the sea-shore, and *b* a reservoir dug out of the cliff. The top edge of this reservoir is about six feet above the highest water-mark, which is indicated at *c*. The bottom of the reservoir is slightly inclined from the two sides to the middle, where there is a sump *d*, extending from end to end. In this sump is a sea-water-inlet pipe *e* of comparatively large diameter and perforated along its under side. The outer end of this pipe leads to or communicates with the sea and is fitted with an automatic inlet-valve. This may be of any suitable form. The drawings show it as a flap-valve *f*, hinged to the pipe *e* at *g* and connected by rods *h i* to the lever *j* of a float *k*.

*l* is an outlet-pipe from the tank at a somewhat higher level than the sump *d*. Although only one outlet-pipe is shown, more may be employed. The outlet-pipe (each outlet-pipe when more than one) is fitted with an automatic valve. This may be of any suitable form. The drawings show it as a flap-valve *m*, operated by a float *n* and lever *p*.

The mode of working is as follows: A suitable quantity of the earth or compound to be used (say calcium carbonate in the form of whitening) is first distributed over the bottom of the reservoir. The quantity to be used will depend upon the time which is to be allowed to elapse between the periodical cleanings of the reservoir hereinafter referred to; but one pound of whitening per ton of sea-water to be treated would be a suitable proportion. As the tide rises no water enters the reservoir b until the rise has reached the prescribed limit of, say, eighteen feet. The inlet-valve f then opens and the water rushes with great force through the perforated pipe e and scours all the lower part of the reservoir, stirring up the sludge and thoroughly mixing it with the body of water let in, the outlet-pipe l being during this time closed by the valve m. The water continues to rise in the reservoir until the tide reaches its full. The water should be retained in the reservoir until the turn of the tide, so that there may be ample time—say ten hours—for the carbonate of calcium in the sludge and on the walls and bottom of the reservoir to act on the salts of gold. The sludge having settled, the water is then allowed to run off through the outlet-pipe l, which ought not to be large enough to cause a sufficiently great efflux of the water to stir up the sludge. The sludge, which will consist mainly of chalk mixed with metallic gold, remains in the sump, from which it can be removed periodically. The gold can be subsequently obtained from the sludge by fusion with any suitable flux or by dissolving the chalk with an acid. Instead of acting upon the sea-water by allowing it to run into a reservoir dug in a cliff, as above described, it is obvious that gold can be obtained from sea-water or other solutions containing gold by adding the chalk or other earth to the sea-water or other solution in any suitable tank or reservoir.

What I claim, and desire to secure by Letters Patent, is—

1. The process of obtaining gold from sea-water containing the same which consists in precipitating the gold by carbonate of calcium.

2. The process of obtaining gold from sea-water which consists in introducing a substance which will form a haloid with the halogen of a gold salt into a reservoir dug out of a cliff at or near the shore, said cliff being composed of a material capable of precipitating gold, allowing sea-water to flow by the natural rise of the tide into said reservoir, allowing the water to remain in said reservoir in contact with said substance for some hours, then after the settling of the sludge running off the sea-water, repeating the above process once or oftener if necessary until the sludge is sufficiently rich in gold, and then treating said sludge to recover the gold, substantially as set forth.

In witness whereof I have hereunto signed my name in the presence of two subscribing witnesses.

JOHN F. DUKE.

Witnesses:
 E. PLAW,
 G. F. WARREN.